Nov. 26, 1940.  A. V. VIROSTEK  2,222,641
TROLLEY WHEEL
Filed July 9, 1938   3 Sheets-Sheet 1

Inventor
A. V. Virostek

By Clarence A. O'Brien
and Hyman Berman
Attorneys

Nov. 26, 1940.  A. V. VIROSTEK  2,222,641
TROLLEY WHEEL
Filed July 9, 1938  3 Sheets-Sheet 2

Inventor
A. V. Virostek

By Clarence A. O'Brien
and Hyman Berman
Attorneys

Nov. 26, 1940.   A. V. VIROSTEK   2,222,641
TROLLEY WHEEL
Filed July 9, 1938   3 Sheets-Sheet 3
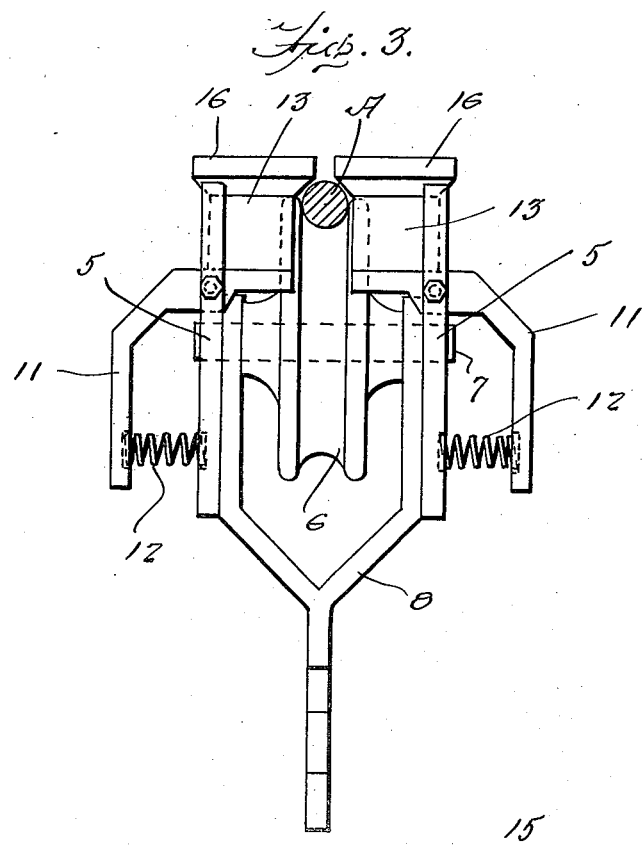
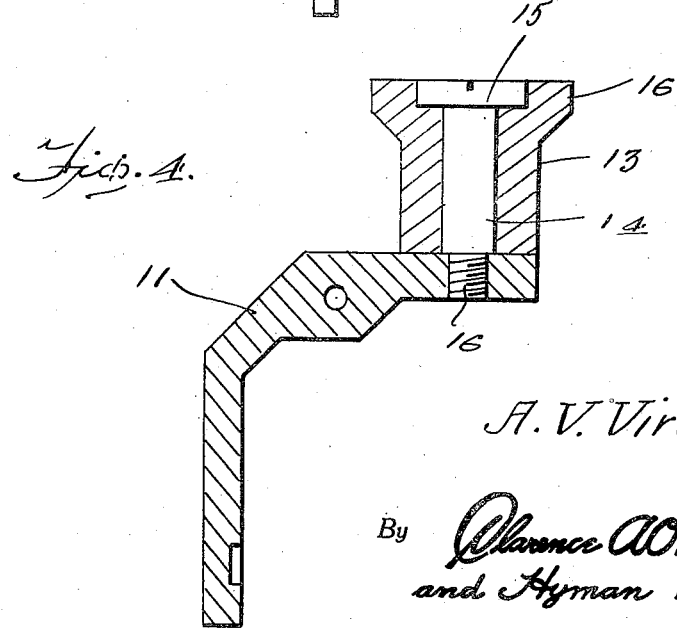
Inventor
A. V. Virostek
By Clarence A. O'Brien
and Hyman Berman
Attorneys Patented Nov. 26, 1940

2,222,641

UNITED STATES PATENT OFFICE 2,222,641

TROLLEY WHEEL

Andrew V. Virostek, Cleveland, Ohio

Application July 9, 1938, Serial No. 218,415

1 Claim. (Cl. 191—77)

This invention appertains to new and useful improvements in electricity transmission means for vehicles and more particularly to a novel trolley wheel.

The principal object of the present invention is to provide a trolley wheel constructed in such a manner as to eliminate the frequent inconvenience of the trolley wheel jumping the trolley wire.

Another important object of the invention is to provide a trolley wheel constructed in such a manner as to afford a constant and uniform contact with the trolley wire to the end that sparking and overheating of the trolley wheel will be substantially eliminated.

These and other important objects and advantages of the invention will become apparent to the reader of the following specification.

In the drawings—

Figure 3 is a sectional view taken substantially on the line 3—3 of Figure 1.

Figure 4 is a vertical sectional view through one of the swingable roller assemblies.

Figure 1:
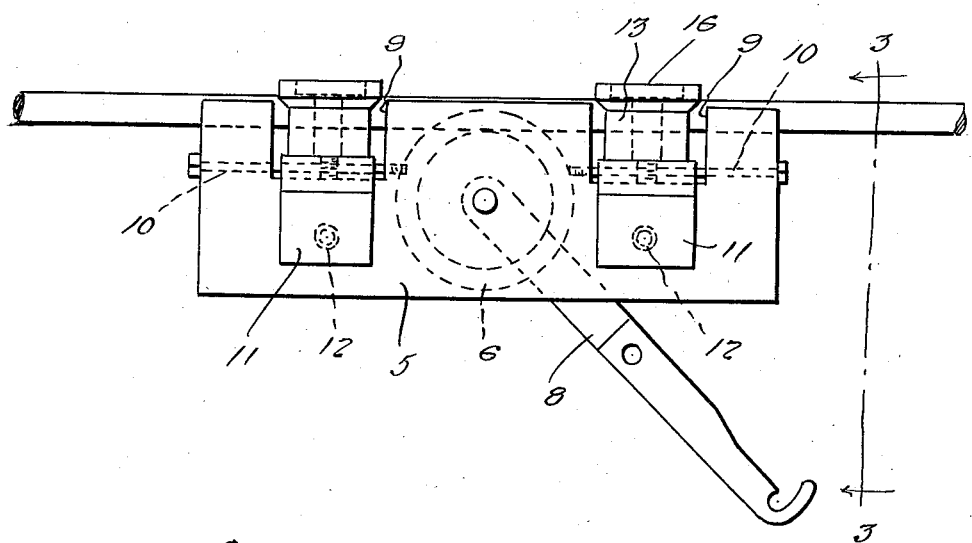
Figure 1 represents a side elevational view of the improved wheel structure.

Referring to the drawings wherein like numerals designate like parts, it can be seen in Figure 1, that the assembly includes a pair of elongated side plates 5—5 which at their intermediate portions are bored to receive the pintles of the trolley wheel 6. These pintles which are denoted by numeral 7 also extend through the upper end of the trolley wheel yoke 8 which is of the conventional construction.

Adjacent each end of each side plates 5 is the downwardly extending cut out portions 9 defining edge portions through which an elongated bolt member 10 extends, this bolt member extending across the notch 9 and through the upper portion of the inverted L-shaped rocker 11. Each of these rockers 11 has a coiled compressible spring 12 interposed between its lower end portion and the adjacent side of the corresponding side wall 5. These threaded members 10 are driven longitudinally into the side wall from the ends of the wall as shown in Figure 1.

A roller 13 is rotatably mounted on a spindle 14 carried by the upper end portion of each of the rockers 11, each of the spindles 14 being provided with a kerfed head 15 and a reduced threaded portion 16, the latter being disposed into a threaded opening of the corresponding rocker 11.

Figure 2:
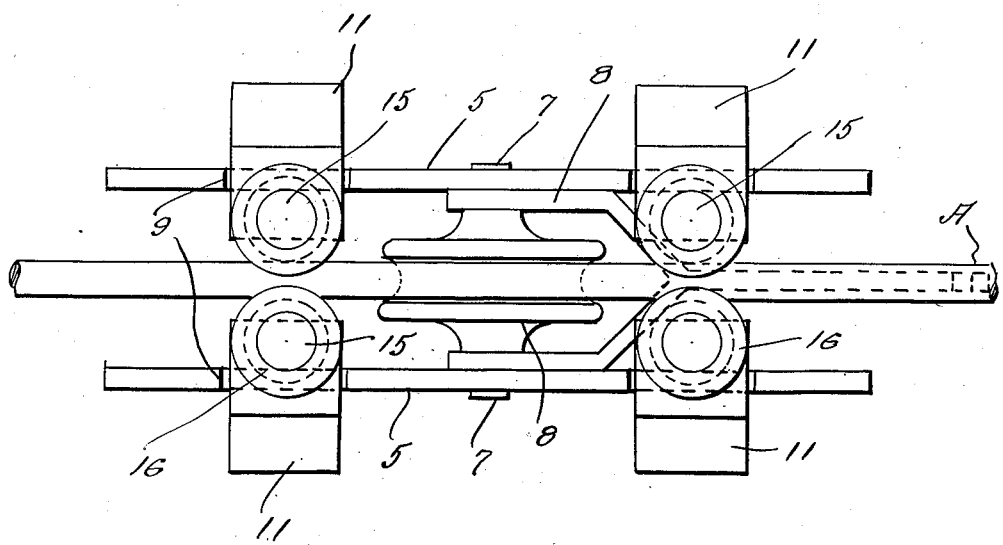
Figure 2 is a top plan view.

Each of these rollers 13 is formed with a beveled head portion 16 which rides against the trolley wire A as clearly shown in Figure 2.

Obviously the spring 12 serves to hold the rollers 13 snugly against the wire A and serves to prevent disengagement of the wheel 6 from the wire A.

Figure 5:
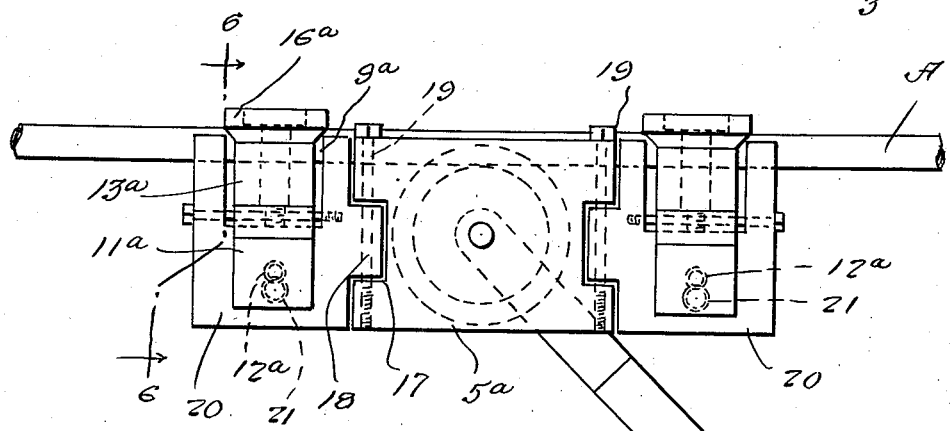
Figure 5 is a side elevational view of a slightly modified form of wheel.
Figure 6:
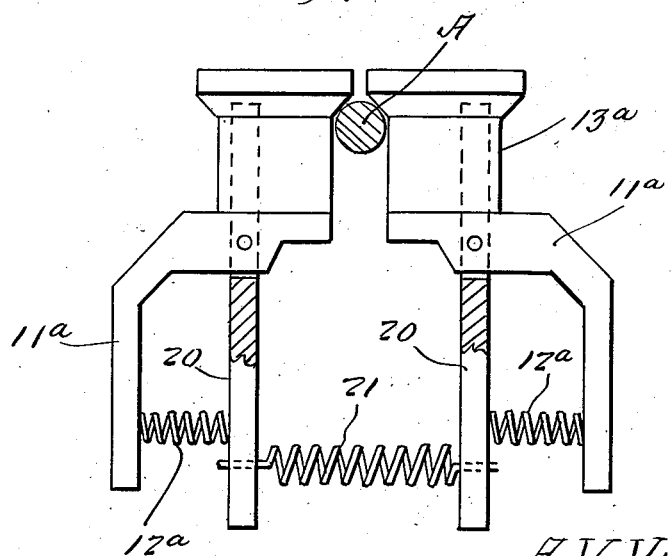
Figure 6 is a sectional view taken substantially on the line 6—6 of Figure 5 with the wheel element removed.

A slightly modified form of the invention is shown in Figures 5 and 6 wherein the side walls 5a—5a are formed with cut out portions 17 at their end portions to receive the reduced bored lug-like extensions 18. Threaded members in the form of pins 19 extend downwardly through the head portions of the plates 5a and through the lugs 18, thus hingedly connecting the end plates 20 to the side plates 5a.

Each of these end plates 20 is notched as at 9a and has mounted therein a roller assembly consisting of the rocker 11a on which is the spool 13a having its end 16a engageable with the trolley wire A. Between each of the rockers 11a and the corresponding plate 20 is the compressible coiled spring 12a.

Connecting each opposed pair of plates 20—20 is a coiled extensible spring 21, these springs serving the plates together and obviously assist the entire assembly to make short turns following a sharply curved trolley wire A.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

A trolley wheel structure comprising a pair of side plates, a trolley wheel rotatably mounted between the said plates, a trolley wire engaging rollers, a mount for each of the rollers, the upper edge portions of the said side plates being formed with downwardly extending notches, said mounts each consisting of an inverted U-shaped member, a pivotal connection between the upper portion of each inverted U-shaped member and the corresponding opening within the lower portion of the corresponding notch, a coiled compression spring interposed between the lower portion of each inverted U-shaped member and the adjacent side plate, said rollers being mounted upon the upper portions of the inverted U-shaped members to extend upwardly through the notches to terminate above the upper edges of the corresponding side plates.

ANDREW V. VIROSTEK.